United States Patent
Ausems et al.

(10) Patent No.: US 6,434,403 B1
(45) Date of Patent: Aug. 13, 2002

(54) PERSONAL DIGITAL ASSISTANT WITH WIRELESS TELEPHONE

(75) Inventors: Michiel R. Ausems, Charlotte, NC (US); Jan B. Ausems, BN Den Haag; Felix N. Akveld, VL Houten, both of (NL); Lee Ann Barrett, San Mateo, CA (US)

(73) Assignee: Bodycom, Inc., Wilmington, DE (US)

( * ) Notice: Subject to any disclaimer, the term of this patent is extended or adjusted under 35 U.S.C. 154(b) by 0 days.

(21) Appl. No.: 09/253,304

(22) Filed: Feb. 19, 1999

(51) Int. Cl.[7] .................................................. H04B 1/38

(52) U.S. Cl. ........................ 455/556; 455/569; 455/575

(58) Field of Search ............................... 455/556, 557, 455/569–575, 90; 248/289.1, 291, 923; 395/2.4; 707/3; 361/610; 364/705.05; 368/10; 379/428, 432, 433

(56) References Cited

U.S. PATENT DOCUMENTS

| | | | | |
|---|---|---|---|---|
| 4,959,850 A | | 9/1990 | Marui ........................... | 379/58 |
| 5,100,098 A | * | 3/1992 | Hawkins ...................... | 248/917 |
| 5,331,138 A | | 7/1994 | Saroya ......................... | 235/449 |
| 5,389,934 A | | 2/1995 | Kass ............................ | 342/357 |
| 5,491,507 A | * | 2/1996 | Umezawa et al. ............ | 348/14 |
| 5,497,339 A | * | 3/1996 | Bernard ................. | 364/705.05 |
| 5,522,089 A | | 5/1996 | Kikinis et al. ............... | 395/893 |
| 5,524,101 A | * | 6/1996 | Thorgersen et al. .......... | 368/10 |
| 5,524,169 A | * | 6/1996 | Cohen et al. ................. | 395/2.4 |
| 5,537,472 A | * | 7/1996 | Estevez-Alcolado et al. .... | 379/433 |
| 5,555,157 A | * | 9/1996 | Moller et al. ................. | 361/683 |
| 5,682,418 A | * | 10/1997 | Ide ............................... | 379/58 |
| 5,715,524 A | | 2/1998 | Jambhekar et al. ........... | 455/90 |
| 5,748,737 A | * | 5/1998 | Daggar ......................... | 380/24 |
| 5,749,072 A | * | 5/1998 | Mazurkiewicz et al. ..... | 704/275 |
| 5,778,256 A | | 7/1998 | Darbee ........................ | 395/892 |
| 5,787,406 A | | 7/1998 | Arsenault et al. ............ | 705/410 |

(List continued on next page.)

FOREIGN PATENT DOCUMENTS

| | | | | |
|---|---|---|---|---|
| AT | 0933733 A2 | * | 4/1999 | ............. G07F/7/10 |
| AT | 0986230 A2 | * | 3/2000 | ........... H04L/29/06 |
| AU | WO9535534 A | * | 12/1995 | ............. G06F/3/02 |
| DE | 0718780 A1 | * | 6/1996 | ........... G06F/15/02 |

OTHER PUBLICATIONS

Katie Hafner, "Web Phone: The Next Big Thing?", New York Times, Apr. 15, 1999, p. D1 and D7.

Michael Kanellos and Jim Davis, "Qualcomm Merges Phones, Handheld", News.com, Sep. 21, 1998.

Mathew Rose, "Who Wins With the Latest "Smart" Phones and Pagers—R&D Teams or Consumers?", The Wall Street Journal Interactive Edition, Sep. 7, 1998.

*Primary Examiner*—Daniel Hunter
*Assistant Examiner*—C. Chow
(74) *Attorney, Agent, or Firm*—Blakely Sokoloff Taylor & Zafman LLP

(57) ABSTRACT

A wireless telephone engine, smart-card engine and Personal Digital Assistant (PDA) engine are integrated in a single device, wherein an address book is shared by the wireless telephone engine and PDA engine. An associated display unit including a touch screen is coupled to the PDA. The smart-card engine is configured to communicate with external devices via a short-range transceiver. Additionally, the PDA engine is configured to automatically balance an electronic account ledger based upon point of sale transactions, and control a remote device by transmitting signals to the device via the short-wave transceiver and/or the wireless telephone engine. The PDA engine is also configured to receive signals from the remote device regarding the status of the remote device. Further, the PDA engine is configured to exchange data with a remote computer via the wireless telephone engine. The exchanged data includes information stored within the PDA engine and the address book.

23 Claims, 9 Drawing Sheets

U.S. PATENT DOCUMENTS

| | | | | |
|---|---|---|---|---|
| 5,790,659 A | * | 8/1998 | Strand | 379/433 |
| 5,797,089 A | * | 8/1998 | Nguyen | 455/403 |
| 5,841,119 A | * | 11/1998 | Rouyrre et al. | 235/380 |
| 5,845,282 A | | 12/1998 | Alley et al. | 707/10 |
| 5,859,973 A | | 1/1999 | Carpenter et al. | 395/200.33 |
| 5,884,156 A | * | 3/1999 | Gordon | 455/350 |
| 5,956,656 A | * | 9/1999 | Yamazaki | 455/575 |
| 5,983,073 A | * | 11/1999 | Ditzik | 455/11.1 |
| 6,024,593 A | * | 2/2000 | Hyland | 439/326 |
| 6,026,375 A | * | 2/2000 | Hall et al. | 705/26 |
| 6,034,866 A | * | 3/2000 | Nobuchi et al. | 361/681 |
| 6,049,796 A | * | 4/2000 | Siitonen et al. | 707/3 |
| 6,115,601 A | * | 9/2000 | Ferreira | 455/406 |
| 6,128,514 A | * | 10/2000 | Griffith et al. | 455/564 |
| 6,133,853 A | * | 10/2000 | Obradovich et al. | 340/905 |
| 6,141,540 A | * | 10/2000 | Richards et al. | 455/90 |
| 6,167,255 A | * | 12/2000 | Kennedy, III et al. | 455/414 |
| 6,178,085 B1 | * | 1/2001 | Leung | 361/683 |
| 6,215,474 B1 | * | 4/2001 | Shah | 345/168 |

\* cited by examiner

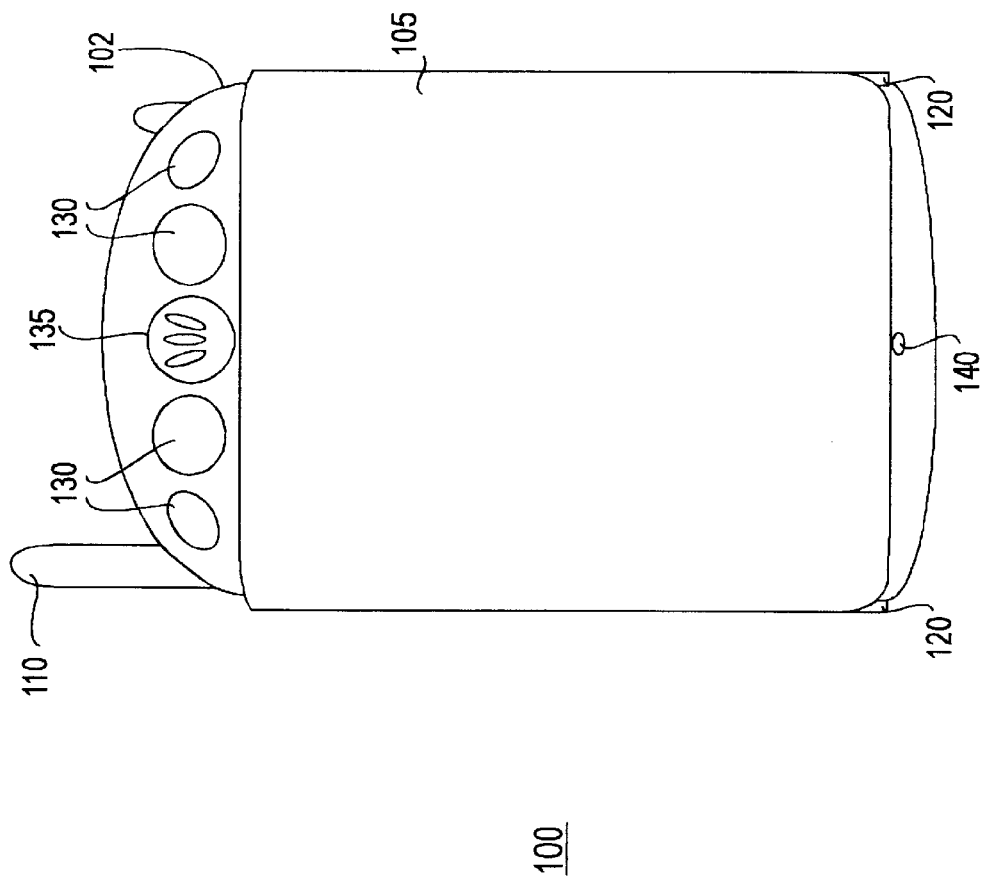
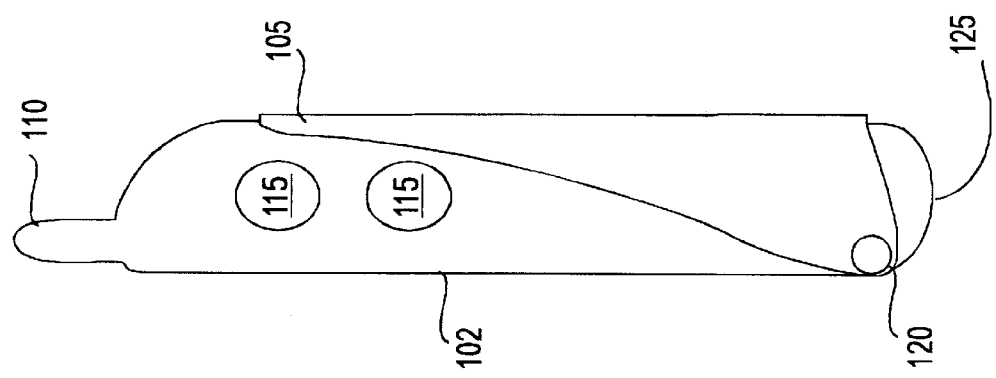
Fig. 1b
Fig. 1a

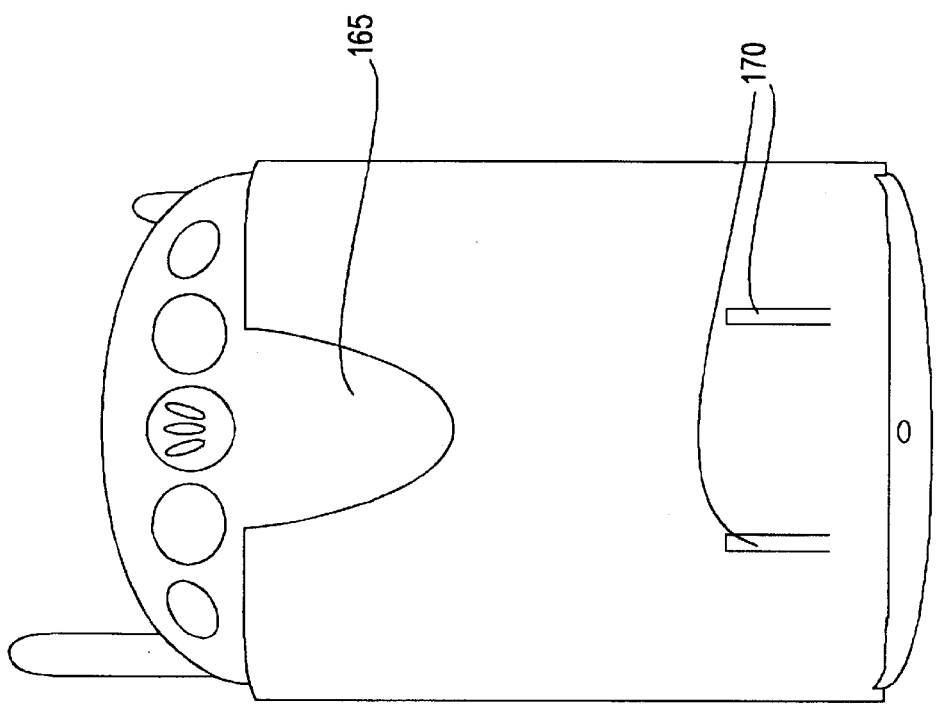

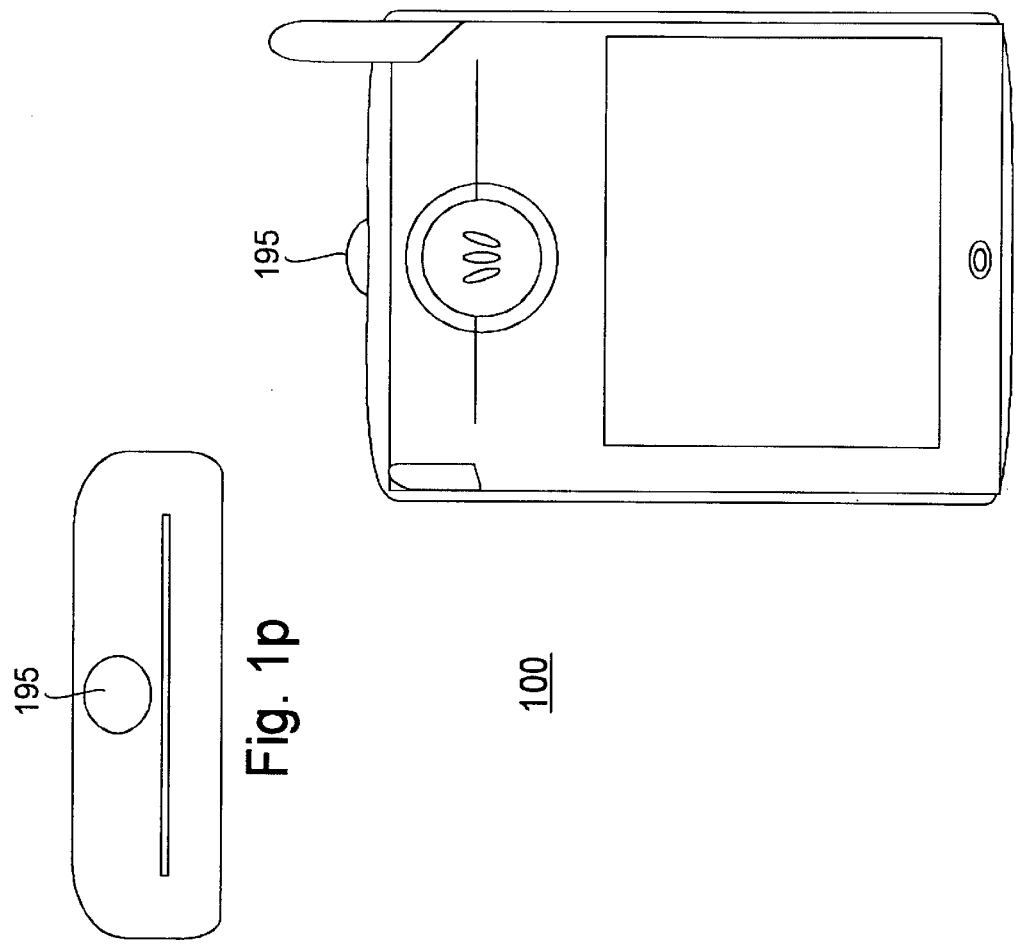
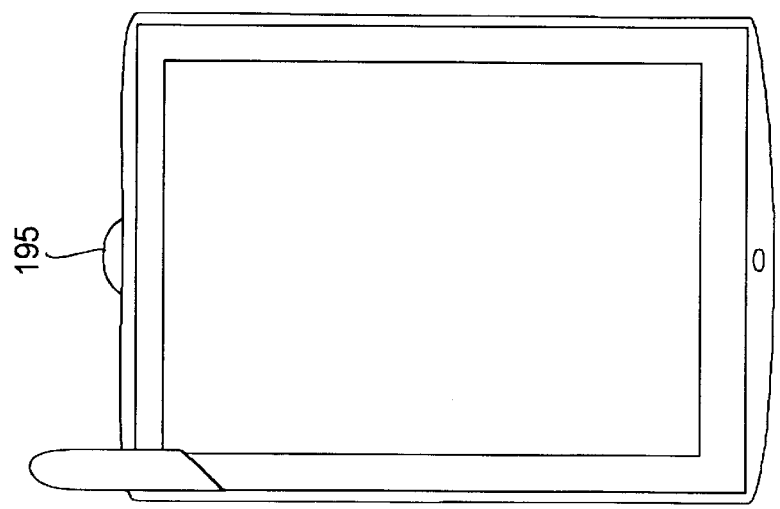

PERSONAL DIGITAL ASSISTANT WITH WIRELESS TELEPHONE

FIELD OF THE INVENTION

The present invention relates to the field of personal digital assistants; more particularly, the present invention relates to a personal digital assistant having expanded capabilities including wireless communication capabilities.

BACKGROUND

The popularity and use of Personal Digital Assistants (PDAs) and wireless telephones has increased in recent years. A PDA or hand-held computer is primarily a lightweight, compact productivity and communications tool that can typically be held in one hand, leaving the other free to input data with a pen type stylus or a reduced size keyboard. A PDA provides computing and information storage and retrieval capabilities for personal or business use. Typical uses include schedule and address book storage and retrieval, as well as note taking functions. In addition, many PDAs are capable of running a variety of application software packages (e.g., calculators, text and/or image editors, etc.).

Wireless telephones are integrated radio transmitter-receivers that are capable of accessing a vast web of existing telephone connections. Increasingly, wireless telephones are being combined with PDAs in order to perform more advanced functions, such as transmitting, receiving and displaying text messages. However, typical PDA/wireless telephone combinations have limited functionality. For example, although typical wireless telephones may provide for limited address book information (e.g., telephone listings by name), they do not feature full address books and schedule calendars. Additionally, typical PDA/wireless telephone combinations are unable to run application software packages or transmit and receive video data. Further, PDA/wireless telephone combinations typically include a small LED display which makes it very difficult to use such units for anything other than displaying telephone numbers and the status of a call.

Due to the limited functionality of typical PDA/wireless telephone combinations, users typically transport both a PDA and a wireless telephone. Having to physically carry around two pieces of electronic equipment is very inconvenient. Thus, having to use both a wireless telephone and a PDA is very cumbersome and disadvantageous. Taking this one step further, users also typically transport a wallet. Having to physically carry around two electronic devices and a wallet is even more inconvenient.

SUMMARY OF THE INVENTION

A wireless telephone engine, smart-card engine and Personal Digital Assistant (PDA) engine are integrated in a single device, wherein an address book is shared by the wireless telephone engine and PDA engine. An associated display unit including a touch screen is coupled to the PDA. The smart-card engine is configured to communicate with external devices via a short-range transceiver. Additionally, the PDA engine is configured to automatically balance an electronic account ledger based upon point of sale transactions, and control a remote device by transmitting signals to the device via the short-range transceiver and/or the wireless telephone engine. The PDA engine is also configured to receive signals from the remote device regarding the status of the remote device. Further, the PDA engine is configured to exchange data with a remote computer via the wireless telephone engine. The exchanged data includes information stored within the PDA engine and the address book.

In another embodiment, the device also includes digital camera for recording images, a modem coupled to the wireless telephone engine and the PDA engine, input/output (I/O) circuitry coupled to the wireless telephone engine, smart-card engine and the PDA engine, and speech recognition circuitry configured to access the wireless telephone engine, the address book and the PDA engine. In addition, the device includes a Global Positioning System (GPS) antenna and a GPS engine coupled to the GPS antenna.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

FIG. 1*a* illustrates the side view of a PDA telephone in accordance with one embodiment of the present invention;

FIG. 1*b* illustrates the front view of a PDA telephone in accordance with one embodiment of the present invention;

FIG. 1*h* illustrates the front view of a PDA telephone in accordance with one embodiment of the present invention;

FIG. 1*n* illustrates the front view of PDA telephone with a Global Positioning System (GPS) in accordance with one embodiment of the present invention;

FIG. 1*o* illustrates the rear view of PDA telephone with a GPS in accordance with one embodiment of the present invention;

FIG. 1*p* illustrates the top view of PDA telephone with a GPS in accordance with one embodiment of the present invention

DETAILED DESCRIPTION

Figure 1D:
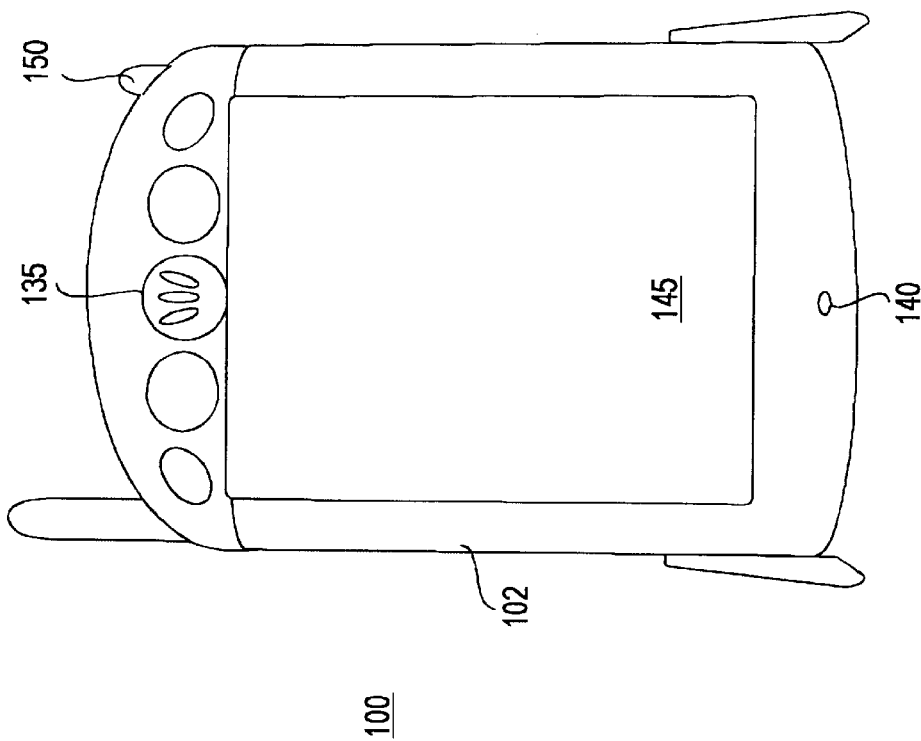
FIG. 1*d* illustrates the front view of a PDA telephone with smart-card reader in accordance with one embodiment of the present invention.

FIGS. 1a–1d illustrate a PDA telephone 100 that provides the combined functionality of a Personal Digital Assistant (PDA) and a wireless telephone and may include other features as discussed below. PDA telephone 100 may be configured to store notes, track calendar appointments, store addresses, and perform other conventional PDA applications. Furthermore PDA telephone 100 may be used to initiate and receive telephone calls, track received calls, store received alphanumeric and text messages, and carry out other functions of a wireless telephone. In addition to combining such functionality into a single unit, PDA telephone 100 may be equipped with optional enhanced feature sets, including: precise positioning capabilities, smart card reader/writer capabilities, short-range wireless transceiver operations, biometric sensor security features, speaker phone functionality, video conferencing/video capture capabilities, and/or remote control capabilities.

Referring to FIGS. 1a and 1b, side and front views of PDA telephone 100 are illustrated, respectively. PDA telephone 100 includes a housing 102 and display cover 105. Display cover 105 protects PDA telephone 100 from undesired contact that could damage the underlying display. According to one embodiment, display cover 105 may remain closed while a user utilizes the telephone features of PDA telephone 100. For example, while a user is conducting a telephone call, display cover 105 may remain closed so that the user does not accidentally touch or scratch the display while holding the unit against an ear.. Additionally display cover 105 may be made entirely or in part of transparent material in order to read information on the underlying display without having to open the cover.

PDA telephone 100 also includes an antenna 110, side-action buttons 115, hinges 120, multi-use port 125, buttons 130, speaker 135 and microphone 140. Antenna 110 functions as a conductive radiation element for PDA telephone 100 that radiates and/or receives electromagnetic waves. Side-action buttons 115 allow single handed operation of PDA telephone 100 with a user's thumb and fingers. Side-action. buttons 115 may be arranged on housing 102 in convenient positions so as to provide left or right-handed user access to PDA telephone 100. In addition, side-action buttons 115 may be used to execute other functions of PDA telephone, such as the muting of telephone calls, the accessing of menu items, etc.

Hinges 120 permit display cover 105 to rotate about housing 102. According to one embodiment, hinges 120 may allow display cover 105 to rotate approximately 270° about a through axis near the bottom of housing 102. Hinges 120 thus permit display cover 105 to rotate to a position that enables housing 102 to rest against display cover 120; Thus, display cover 105 may function as a stand for housing 102 (See FIGS. 1c and 1d).

Multi-use port 125 may be used to connect PDA application equipment, such as an external modem, to PDA telephone 100. In addition, multi-use port 125 may be used to couple or synchronize PDA telephone 100 with a computer system in order to backup or download user files. Further, multi-use port 125 may be used to connect an external power source to PDA telephone 100.

Buttons 130 also allow single handed operation of PDA telephone 100 with a user's thumb and fingers. These buttons provide user access to features of PDA telephone 100 that may not be accessible using side-action buttons 115 and/or that may be user-assigned. According to one embodiment, one button may be used to activate a lamp to light up PDA telephone 100. Another button may be used to initiate/end a telephone call. Further, a button may be used to power PDA telephone 100 on and off. However, one of ordinary skill in the art will appreciate that buttons 130 may be used to perform other functions in PDA telephone 100, such as speaker volume adjustment, etc. Such functions may depend on a selected mode of operation.

Speaker 135 transmits audio information from PDA telephone 100 to a user. Microphone 140 transmits audio information from a user to PDA telephone 100 and converts the information to electrical signals. Each of these units operates in the conventional fashion, and may further permit the presentation of audio tones/alarms to a user and/or the integration of voice/speech activated functions.

Figure 1C:
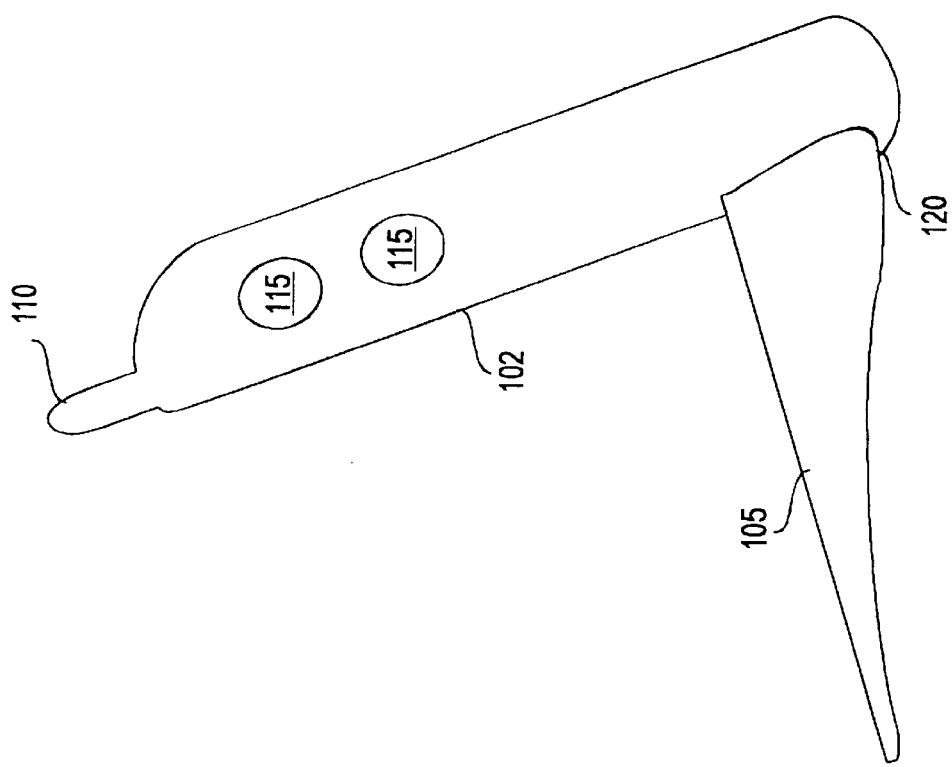
FIG. 1*c* illustrates a side view of a PDA telephone in accordance with one embodiment of the present invention.

Referring to FIGS. 1c and 1d, side and front views of PDA telephone 100 are illustrated, respectively, with display cover 105 opened. PDA telephone 100 further includes a display 145 and stylus 150. Display 145 provides a visual means for displaying information to a user. According to one embodiment, display 145 is approximately 60×80 mm and is configured to accommodate up to 40 characters on each of 40 lines. Further, display 145 provides for scaleable font sizes. However, one of ordinary skill in the art will appreciate that PDA telephone 100 may be configured with other types of displays of different dimensions.

A user may control cursors and/or other elements displayed on display 145 by manipulating side-action buttons 115 and/or buttons 130. Additionally, display 145 may be a touchscreen that is accessed by touching fields of display 145 with a finger or with stylus 150. In FIG. 1d, stylus 150 is shown housed in a recessed opening of housing 102. Stylus 150 may be a conventional pen-type stylus or fingertip stylus if so preferred. Where a touchscreen is used, PDA telephone 100 may be configured to recognize handwriting written on display 145.

Figure 1F:
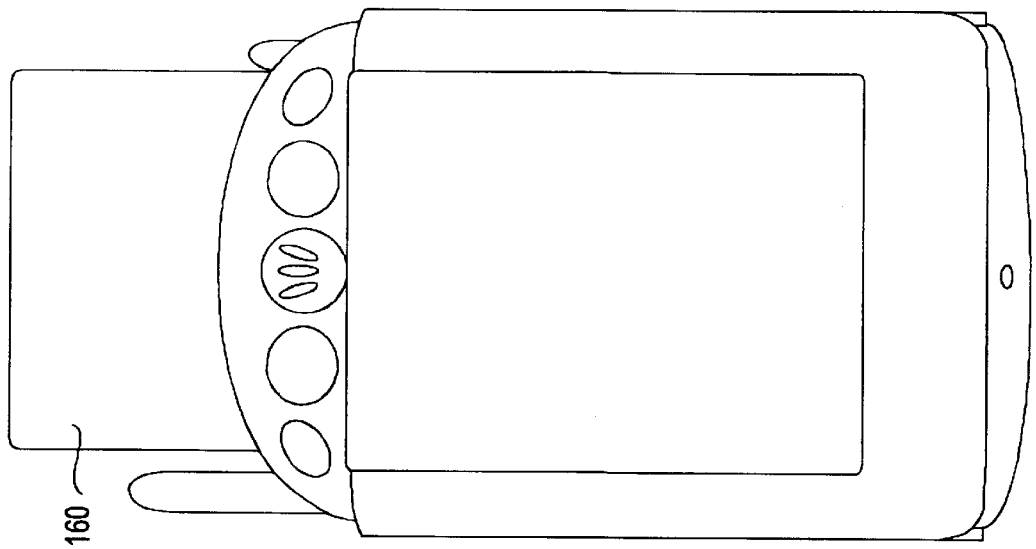
FIG. 1*f* illustrates the front view of a PDA telephone with smart-card reader in accordance with one embodiment of the present invention.
Figure 1G:
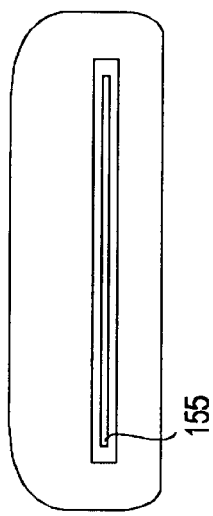
FIG. 1*g* illustrates the top view of a PDA telephone with smart-card reader in accordance with one embodiment of the present invention.
Figure 1E:
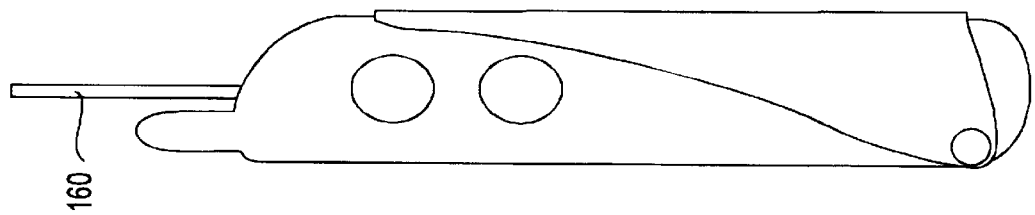
FIG. 1*e* illustrates a side view of a PDA telephone with smart-card reader in accordance with one embodiment of the present invention.

FIGS. 1e, 1f and 1g, illustrate the smart card functionalities that may be included in PDA telephone 100. In such embodiments, PDA telephone 100 includes a smart-card slot 155 that provides access to a smart-card reader/writer (not shown in this illustration). According to one embodiment, the smart-card reader/writer may be configured to read encoded information stored on a smart-card and/or to write information thereto. Smart-card 160 contains an embedded chip that may store information for credit, cash, prepaid phone and/or medical smart-card applications, to name a few.

FIG. 1h illustrates a further embodiment of PDA telephone 100 demonstrating smart-card storage means 165 with integrated pressing mechanisms 170. Smart-card storage means 165 may be a plastic wall embedded between display cover 105 and display 145. Smart-card storage means 165 enable multiple smart-cards 160 to be stored with PDA telephone. 100 without scratching display 145. Alternatively, smart-card storage means 165 may be implemented by providing a slot on the outside of display cover 145 or on housing 102. Pressing mechanisms 170 provide a locking mechanism to ensure that smart-cards 160 do not unintentionally slide out of smart-card storage means 165.

Figure 1K:
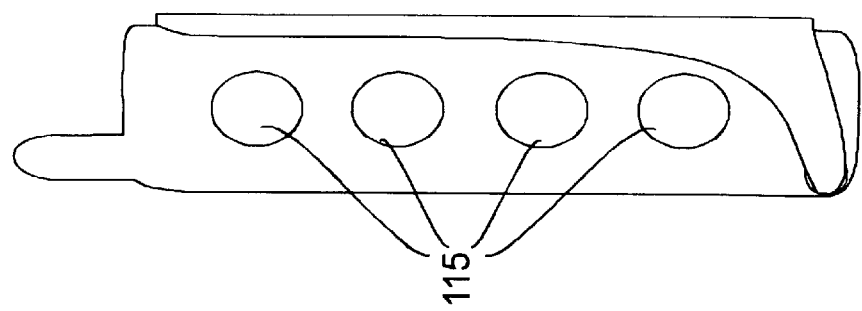
FIG. 1*k* illustrates the side view of PDA telephone in accordance with one embodiment of the present invention.
Figure 1J:
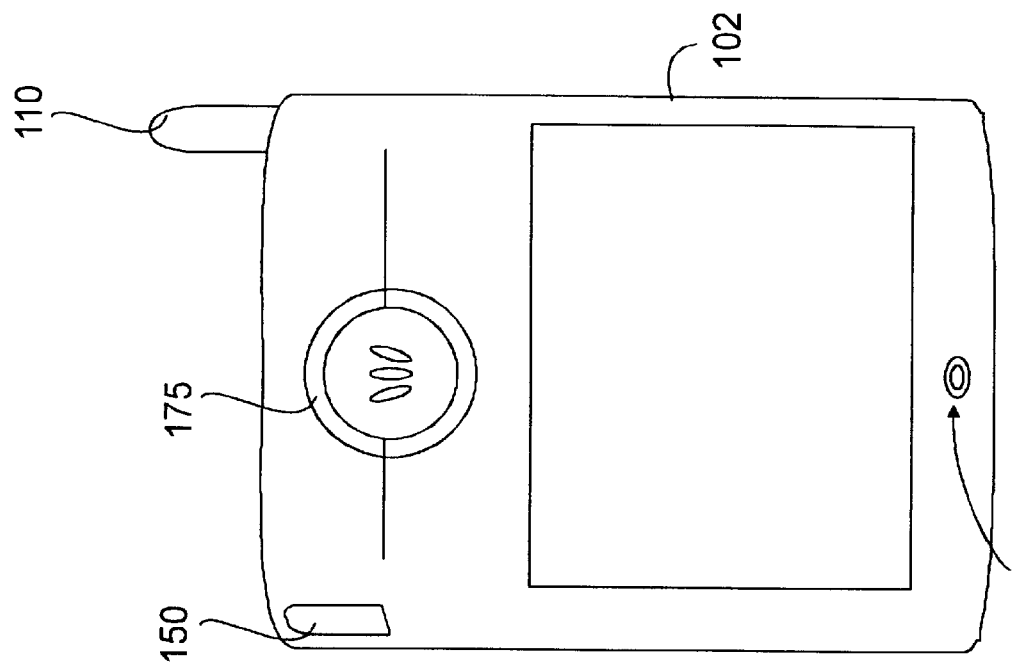
FIG. 1*j* illustrates the rear view of PDA telephone in accordance with one embodiment of the present invention.
Figure 1I:
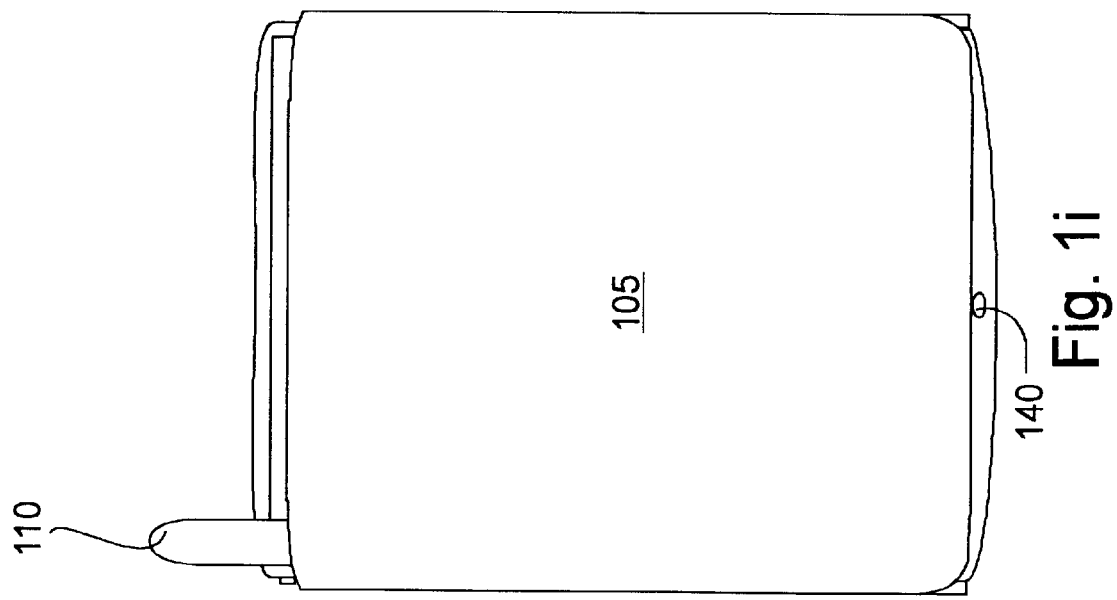
FIG. 1*i* illustrates the front view of PDA telephone in accordance with one embodiment of the present invention.

FIGS. 1i–1m illustrate still further embodiments of PDA telephone 100. Referring to FIGS. 1i–1k, buttons 130 are replaced with (or augmented by) additional side-action buttons 115. Also, housing 102 is adapted to allow for a speaker 175 and microphone 180 located on the reverse side of the unit. By positioning speaker 175 and microphone 180 on the reverse side of the unit, the length of PDA telephone 100 is now determined by the length of display 145 (e.g., 80 mm). Further, because of the location of speaker 175 and microphone 180 a user is assured of not damaging display 145 when using the telephone features of PDA telephone 100. In some cases, side-action buttons 115 may also be configured to operate as alphanumeric keys (i.e., in addition to the functions noted above) so that a user may dial a number in order to initiate a telephone call.

Figure 1M:
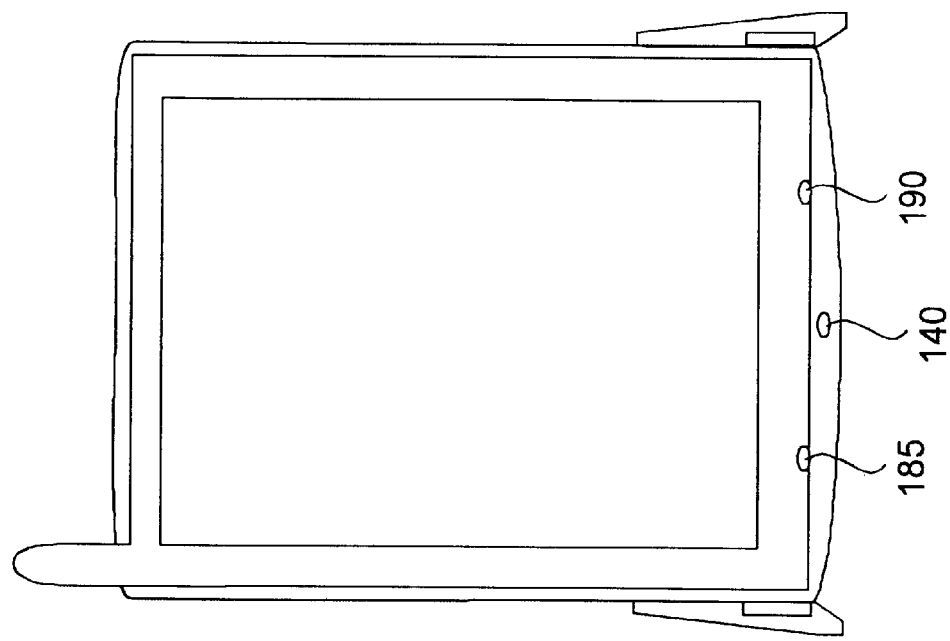
FIG. 1*m* illustrates the front view of PDA telephone in accordance with one embodiment of the present invention.
Figure 1L:
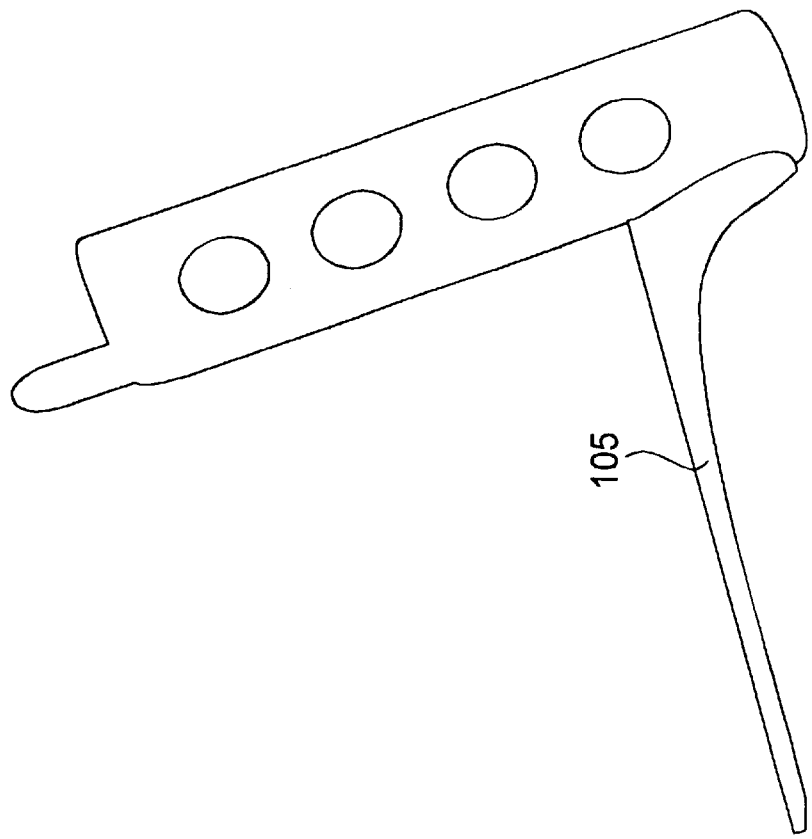
FIG. 1*l* illustrates a side view of PDA telephone in accordance with one embodiment of the present invention.

Referring to FIGS. 1*l*–1*m*, PDA telephone 100 may also include a loudspeaker 185 (e.g., in place of speaker 135) and/or a camera 190. Loudspeaker 185 transmits audio information from PDA telephone 100 to a user. Loudspeaker 185 delivers sound at a sufficient level to enable a user to receive audio information without placing an ear to PDA telephone 100 (i.e., during speakerphone operation). Camera 190 records video images and stores them within. PDA telephone 100. Additionally, video images recorded by camera 190 may also be transmitted from PDA telephone 100 in real time during a telephone call (thus allowing for video conferencing). Additional loudspeakers 185 may be included in order to provide stereo sound.

As indicated, PDA telephone 100 may operate in a speaker phone mode. As discussed above, display cover 105 rotates to function as a stand for housing 102. Thus, housing 102 will be angled (e.g., with reference to a level plane), whenever it is in a resting position against display cover 105. The angled position of housing 102 provides an optimal positioning for the speaker phone mode since it directs loud speaker 185 and microphone 140 towards a user. In the speaker phone mode users may carry out hands-free telephone conversation without the use of additional attachments to PDA telephone 100. For video conferencing, video information may be displayed on display 145 while audio is played but through loud speaker 185.

FIGS. 1*n*–1*p* illustrate PDA telephone 100 configured with further enhancements. In this embodiment, PDA telephone 100 includes a Global Positioning System (GPS) receiver/engine having an associated antenna 195 for receiving signals from GPS satellites. GPS antenna 195 is coupled to GPS receiver circuitry (at least some of which may be software GPS engine functions) within housing 102 for calculating the position of PDA telephone 100. The use of such GPS technology may allow for the inclusion of mapping and other features associated with conventional GPS devices.

Figure 2:
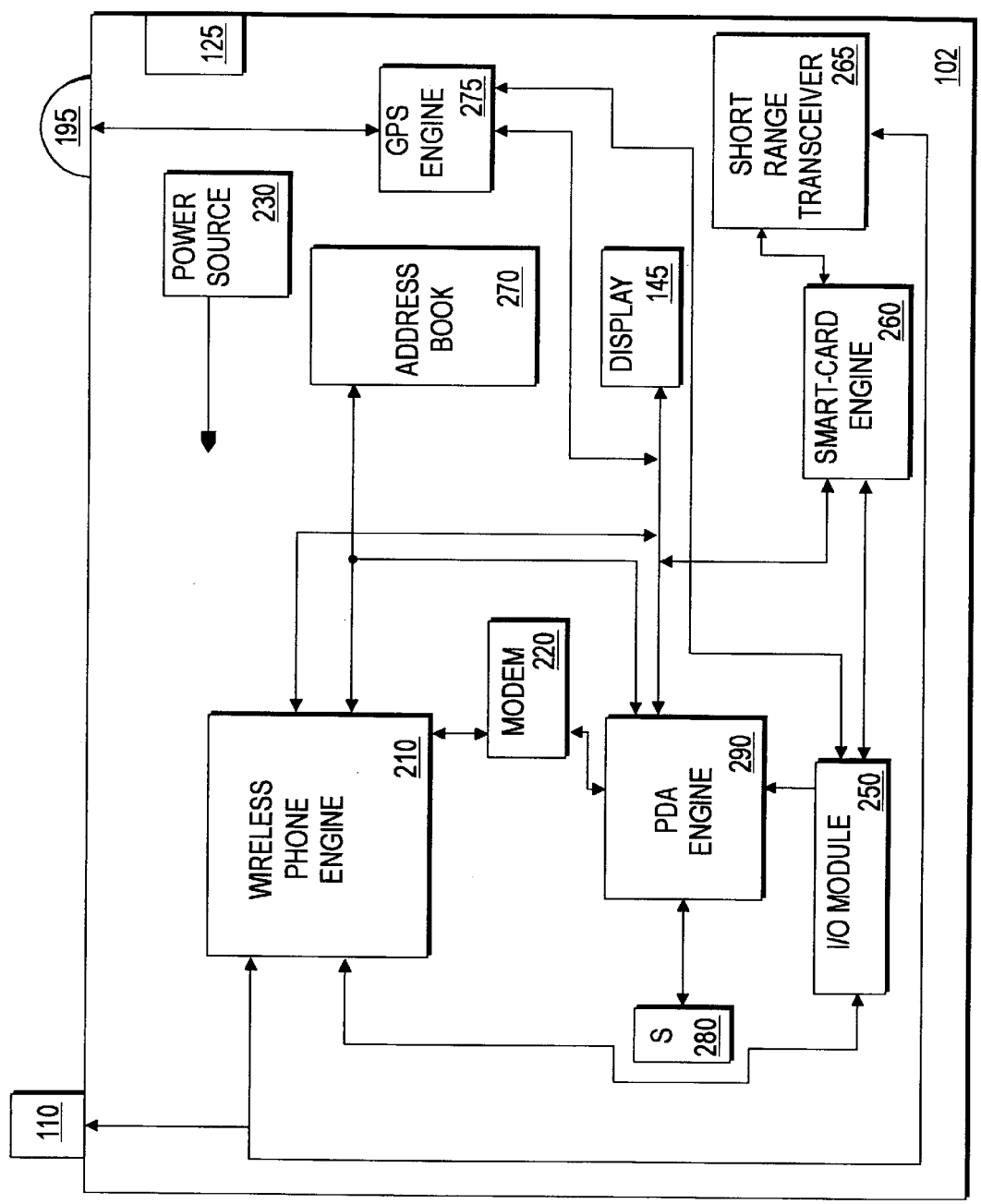
FIG. 2 illustrates a block diagram of a housing of a PDA telephone with smart-card reader in accordance with one embodiment of the present invention.

FIG. 2 illustrates the major components of PDA telephone 100 in block diagram form. PDA telephone 100 includes a wireless phone engine 210, modem 220, power source 230, display unit 145, input/output (I/O) module 250, smart-card engine 260, short-range transceiver 265, address book 270, GPS engine 275, synchronization circuitry 280, and PDA engine 290.

Wireless telephone engine 210 provides the wireless telephone operations of PDA telephone 100. Wireless phone engine 210 transmits and receives audio data via antenna 110, as well as text and images. Wireless phone engine 210 may include a CPU, a long range transceiver for transmitting and receiving data, and a digital signal processor for converting between analog and digital data. According to one embodiment, wireless phone engine 210 may operate on an analog control channel. However, in a further embodiment, wireless phone engine 210 may also operate on a digital control channel.

Modem 220 is coupled to wireless phone engine 210 and enables PDA telephone 100 to send and receive fax messages, or have Internet access. Power source 230 provides an electrical power supply to PDA telephone 100 whenever it is powered up. According to one embodiment, power source 230 may include one or more battery cells. However, in a further embodiment, an external power supply may be coupled to PDA telephone 100 via multi-use port 125 in order to provide a power supply.

Display 145 is coupled to wireless telephone engine 210, smart-card engine 260 and PDA engine 290. As discussed above, display 145 may include a touchscreen that is accessed by touching display 145 with a finger or stylus. I/O module 250 provides an interface for inputting and outputting data to wireless phone engine 210, smart-card engine 260 and PDA engine 290. 10 module 250 handles data transmitted to and from side-action buttons 115, buttons 130, multi-use port 125, speakers 135 and 175, microphone 140, loud speaker 185, camera 190 and display 145 (where a touchscreen is used).

Smart-card engine 260 processes encoded information received from a smart-card and also provides the smart card writing capabilities. Short-range transceiver 265 is a low-power transceiver (e.g., a Bluetooth transceiver) coupled to smart-card engine 260 and antenna 110. Short-range transceiver 265 enables PDA telephone 100 to establish a wireless link in order to communicate with other devices. According to one embodiment, smart-card engine 260 may be configured to communicate with various point-of-sale terminals and/or other appliances via short-range transceiver 265. In such an embodiment, a user may purchase items using PDA telephone 100 and a cash card/debit card/credit card and other smart card.

For example, before proceeding to a checkout counter to purchase one or more items, the user may insert a smart credit or cash card into smart-card slot 155. While at the checkout counter the merchant initiates a high data rate wireless communication link with PDA telephone 100 via antenna 110 and smart-card engine 260. Smart-card engine 260 reads the card account information and transmits it to the point of sale terminal along with a user identification number. The terminal may then transmit information back to PDA telephone 100 indicating the charged amount, merchant ID, etc. Additionally, user confirmation signals may be transmitted back to the point of sale terminal.

According to yet another embodiment, PDA telephone 100 may be configured to carry out automatic checkbook functions. In this embodiment, the sale transaction information is transmitted from smart-card engine 260 to PDA engine 290 in order to update a financial accounting record of the useŕs personal or business finances. In addition, the transaction information may be transmitted to a financial institution via wireless telephone engine 210. Subsequently, the financial institution may transmit the new balance of the account back to PDA telephone 100, where it is stored in PDA engine 290. Consequently, PDA telephone 100 may automatically update a useŕs checkbook each time a transaction is executed. Note, in some cases, smart-card engine 260 may include one or more smart-card chips, thus obviating the need for external smart cards.

Address book 270 is coupled to wireless phone engine 210 and PDA engine 290. Address book 270 may store a user ́s address and calendar information that may be accessed by both wireless phone engine 210 and PDA engine 290. A user may directly access an entry, or select from a list of entries, in address book 270 in order to retrieve a telephone number to dial. Wireless phone engine 210 subsequently accesses address book 270 and retrieves a desired telephone or fax number corresponding with the selected entry. If more than one telephone or fax number is available for a listing the user may select which number is to be dialed by wireless phone engine 210 or numbers may be dialed in sequence (e.g., work numbers first, then home numbers, etc.) until a connection is made. After selecting an entry wireless phone engine 210 dials the number and establishes a wireless connection without requiring further user input.

A user may also retrieve entries from address book 270 simply to display on display 145. According to one embodiment, the user selects an icon on display 145 that initiates a listing of the entries in address book 270. Alternatively, the user may initiate a key word search for an entry. Once an entry is selected, full address information, including telephone and fax numbers, is transmitted from address book 270 to PDA engine 290, and thereafter to display 145. In another embodiment, wireless telephone engine 210 may retrieve an electronic mail (e-mail) address and/or a world wide web URL from address book 270 in order to initiate a transaction.

According to a further embodiment, the user may manually select an item of an entry displayed on display 145 (e.g., telephone number, e-mail address, etc.) in order to initiate a transaction. The user may select the item by tapping the location on display 145 at which the item is displayed. After selecting the item, the user may engage wireless phone engine 210 by manipulating side-action buttons 115 or buttons 130. The telephone number to be dialed is then transferred from PDA engine 290 and transmitted to wireless phone engine 210. Wireless phone engine 210 subsequently dials the number in order to carry out the transaction.

GPS engine 275 is coupled to display 145, GPS antenna 195, I/O module 250 and PDA engine 290. GPS engine 275 receives signals from GPS satellites via GPS antenna 195 and calculates the position of PDA telephone 100 in the conventional fashion. A system user may access GPS engine 275 by manipulating side-action buttons 115, by the touch screen of display 145 or through voice activation. According to one embodiment, the positioning information received is displayed on display 145, for example using stored on retrieved maps. However, in another embodiment, the positioning information (e.g., latitude and longitude, etc.) may be presented to a user in the form of audio played out over speakers 185 and/or 190.

Synchronization circuitry 280 is coupled to PDA engine 290 and is used to synchronize PDA telephone 100 with a computer system in order to transfer and/or backup PDA applications and data files. Thus, PDA engine 290 functions as a data storage and processing unit for PDA telephone 100. Such synchronization schemes are well known in the art and need not be further described herein.

Figure 3:
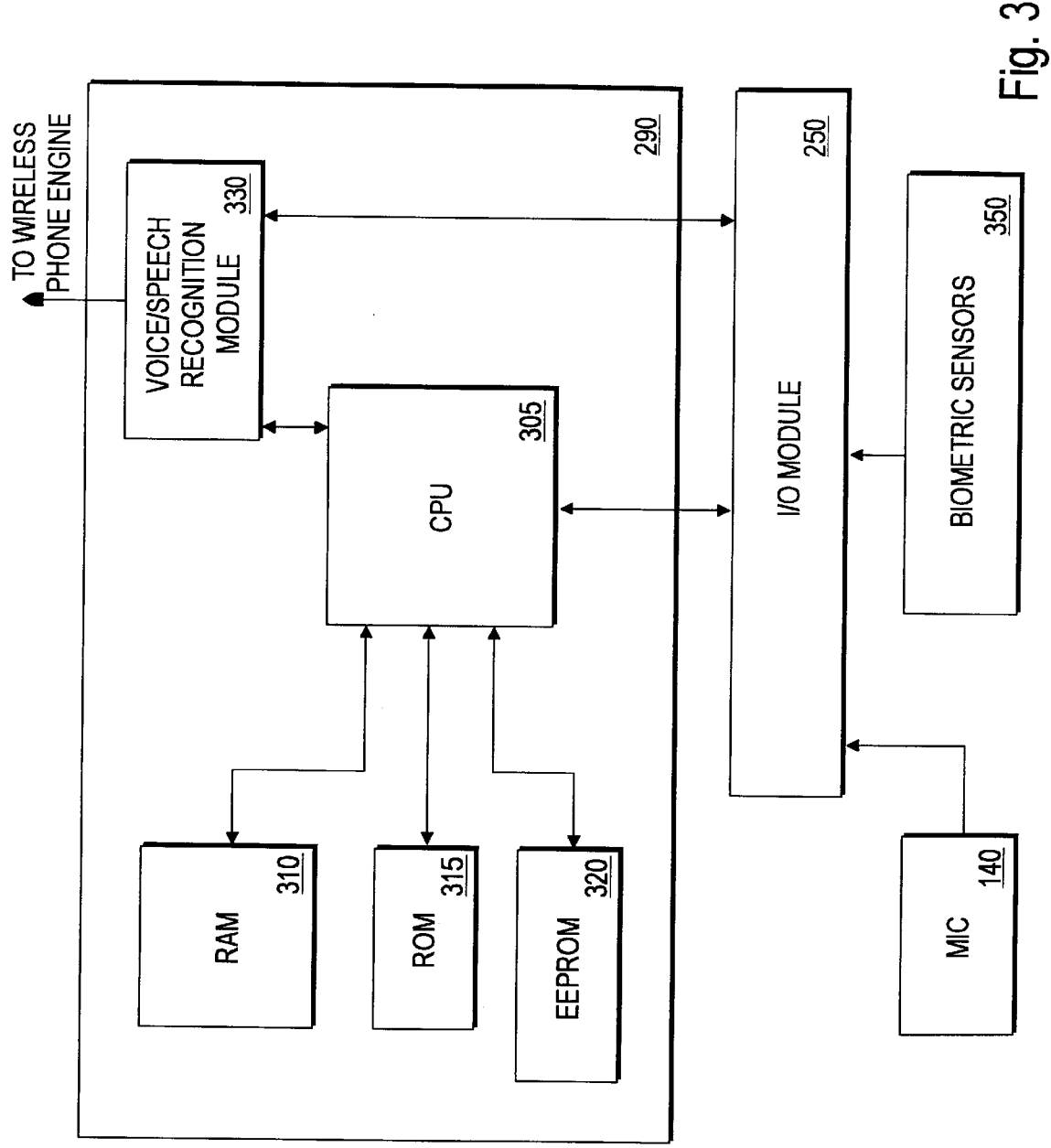
FIG. 3 illustrates a block diagram of a PDA engine in accordance with one embodiment of the present invention.

Referring now to FIG. 3, PDA engine 290 is illustrated in further detail and includes central processing unit (CPU) 305, random access memory (RAM) 310, read only memory (ROM) 315, electrically erasable programmable read only memory (EEPROM) 320 and voice/speech recognition module 330. I/O module 250 is coupled to CPU 305 and voice/speech recognition module 330. CPU 305 processes information received at PDA engine 290. RAM 310 is coupled to CPU 305 and is used as a temporary storage area for data processed by CPU 305.

ROM 315 is coupled to CPU 305. ROM 315 stores the operating system for PDA telephone 100. According to one embodiment, PDA telephone 100 uses a Microsoft Windows CE®-based operating system. However, one of ordinary skill in the art will appreciate that PDA telephone 100 may function using other operating systems (e.g., the Palm™ operating system of 3Com Corp.). According to another embodiment, the operating system may include a web browser in order to facilitate Internet access for a PDA telephone 100. EEPROM 320 is also coupled to CPU 305 and may be used to store application software.

Voice/speech recognition module 330 is coupled to CPU 305 and has the ability to recognize and carry out voice commands. Voice/speech recognition module 330 stores a vocabulary of words that are used to initiate commands and access data. Voice/speech recognition module 330 may also be configured to identify a speech patterns of one or more users against stored replicas thereof.

According one embodiment, a user may initiate a telephone call by issuing a voice command. For example, a user may give a command to ìCALL JOHNí. This command is transmitted from microphone 140 through I/O module 250 to voice/speech recognition module 330. Voice/speech recognition module 330 parses the input, recognizes a request to make a telephone call and forwards the command to wireless telephone engine 210. Wireless phone engine 210 subsequently accesses address book 270 and retrieves one or more desired telephone numbers corresponding with the selected entry.

If there is only one person with the requested name to call (e.g., JOHN), and one telephone number for that person, wireless telephone engine 210 automatically dials the telephone number of the name spoken by the user. If there is more than one person with the name spoken by the user, or more than one telephone number for that person, stored in address book 270, a listing is displayed on display 145 that prompts the user to select the desired telephone number to dial. After making a selection, wireless telephone engine 210 dials the number. In a further embodiment, a user may initiate a call by reciting the telephone number of the person to call.

According to yet another embodiment, a user may show a listing on display 145 by issuing a command. For example, a user may give a command to ìDISPLAY JANEí. As described above, this command is transmitted from microphone 140 through I/O module 250 to voice/speech recognition module 330. Voice/speech recognition module 330 recognizes a request to show the requested name on display 145 and forwards the command to CPU 305. CPU 305 subsequently accesses address book 270 and retrieves the desired address information corresponding with the selected entry.

If there is only one person with the requested name to call (e.g., JANE), CPU 305 transmits the address information to display 145 where it is displayed. If there is more than one person with the name spoken by the user stored in address book 270, a listing is shown on display 145 with all entries stored in address book 270 with the spoken name. After the user makes a selection, CPU 305 transmits the address information of the person selected to display 145 where it is displayed. The examples shown above are only illustrative of embodiments of the present invention, and not limiting. One of ordinary skill in the art will recognize that voice/speech recognition module 330 may be configured to recognize and execute a multitude of commands. For example, a user may view or access an e-mail address or web-site URL by issuing a command in a manner that is similar to viewing or initiating a telephone call.

Biometric sensors 350, such as fingerprint ID devices, etc., may also be coupled to PDA telephone 100 through I/O module 250. Such sensors 350 may provide security features that prevent unauthorized users from exploiting PDA telephone 100.

According to another embodiment, PDA telephone 100 may also function as a remote controller. In such an embodiment, PDA engine 290 transmits signals to various devices using either wireless telephone engine 210 or short range transceiver 265. For example, PDA telephone 100 may be configured to remotely control audio/video appliances, automobile door locks, garage door openers, home alarm systems, heating, ventilation, and air conditioning systems, etc.

Each device to be controlled by PDA telephone 100 is equipped with a wireless transceiver or receiver. The transceiver/receiver is configured to receive functional commands from PDA telephone 100 to take some particular action. If the device is equipped with a transceiver, the device may also be configured to transmit status information back to PDA telephone 100.

According to a further embodiment, PDA telephone 100 may remotely communicate with a computer system. PDA telephone 100 may remotely transmit the contents of address book 270 and/or PDA engine 275 using wireless telephone engine 210. This permits PDA telephone 100 to back up files by downloading them to a remote computer system. The wireless transaction between PDA telephone 100 and the computer system may be initiated by either PDA telephone 100 or the computer system. For example a PDA telephone 100 user may initiate the transaction by speech control, side-action buttons 115 or display 145. Alternatively, the computer system may be configured with an alarm that initiates a wireless connection with PDA telephone 100.

Thus, a PDA with wireless telephone has been described.

What is claimed is:

1. A communication device comprising:

a housing having a front side and a back side;

a cover rotatably attached to the housing and being rotatable from a first position to a second position, wherein when the cover is in the first position, the cover is in contact with the front side of the housing at least partially covering a display of the communication device and the communication device is operable in a phone mode, and when the cover is in the second position the cover is disposed at an angle relative to the housing and is prevented from further rotation towards the back side of the housing thus functioning as a stand for speakerphone operation of the communication device; and a speaker located on the back side of the housing.

2. The communication device of claim 1 further comprising:

a wireless telephone engine housed within the housing; and a Personal Digital Assistant (PDA) engine housed within the housing and coupled to the wireless telephone engine.

3. The communication device of claim 1 further comprising an electronic address book configured to be accessible by both the wireless telephone engine and the PDA engine.

4. The communication device of claim 3 further comprising a display coupled to the PDA engine.

5. The communication device of claim 4, wherein the display comprises a touch screen.

6. The communication device of claim 5 wherein when the cover is in the first position, the cover covers the display.

7. The communication device of claim 6, wherein the wireless telephone engine may be accessed to place or receive a telephone call while the cover is covering the display.

8. The communication device of claim 3, further comprising a smart-card engine housed within the housing.

9. The communication device of claim 8, wherein the PDA engine is configured to automatically balance an electronic account ledger based upon point of sale transactions.

10. The communication device of claim 8 further comprising input/output (I/O) circuitry coupled to the wireless telephone engine, smart-card engine and the PDA engine.

11. The communication device of claim 8, comprising:

a slot in the housing adapted for storing smart-cards.

12. The communication device of claim 8, further comprising a short-range transceiver coupled to the smart card engine.

13. The communication device of claim 12, wherein the PDA engine is configured to exchange information with a remote device via the short-range transceiver.

14. The communication device of claim 3 further comprising speech recognition circuitry housed within the housing.

15. The communication device of claim 14, wherein the speech recognition circuitry is configured to access the wireless telephone engine, the address book and the PDA engine.

16. The communication device of claim 3 further comprising a digital camera.

17. The communication device of claim 3 further comprising a modem coupled to the wireless telephone engine and the PDA engine.

18. The communication device of claim 3, wherein the PDA engine is configured to exchange data with a remote computer via the wireless telephone engine.

19. The communication device of claim 1 further comprising:

a Global Positioning System (GPS) antenna attached to the housing; and a GPS engine housed within the housing and coupled to the GPS antenna.

20. The communication device of claim 1, further comprising:

a biometric sensor coupled to the PDA engine.

21. The communication device of claim 1, further comprising:

a first microphone located on the front side of the housing.

22. The communication device of claim 21, further comprising a second microphone located on the back side of the housing.

23. The communication device of claim 1, further comprising a microphone located on the back side of the housing.

* * * * *